Jan. 26, 1954
C. MUCKENFUSS
2,666,983
PIPE-CUTTING DEVICE
Filed Oct. 29, 1952
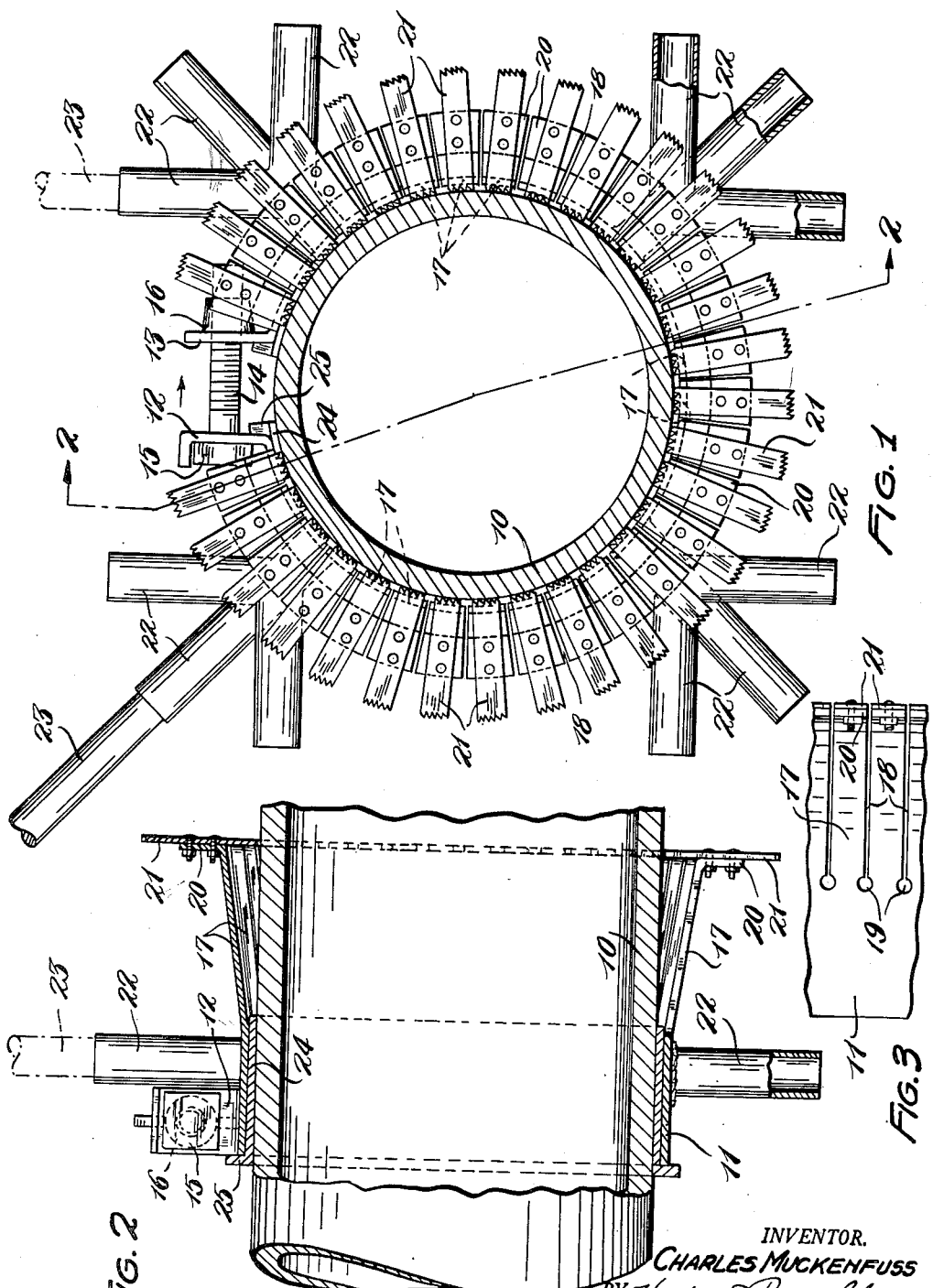
INVENTOR.
CHARLES MUCKENFUSS
BY Hudson, Boughton,
Williams, David & Hoffmann
ATTORNEYS Patented Jan. 26, 1954

2,666,983

UNITED STATES PATENT OFFICE 2,666,983

PIPE-CUTTING DEVICE

Charles Muckenfuss, Lakewood, Ohio

Application October 29, 1952, Serial No. 317,452

7 Claims. (Cl. 30—96)

This invention relates to a pipe cutting device and more particularly to a pipe cutting saw having especial utility for cutting underground or buried pipes.

Difficulty has been experienced in the use of the heretofore known pipe cutting devices for cutting pipes that are buried under ground. The usual pipe cutting device requires ample free space in which to operate the device. Consequently when such device is employed to cut a pipe that is buried under ground it has been necessary to provide a very wide opening for access to the pipe and to afford the requisite space in which to operate the pipe cutting device. Of course this requires the expenditure of more labor and time in the digging of the enlarged opening.

As one example of a use where a pipe cutting device embodying the invention has particular utility reference is made to the main supply pipes for an automatic sprinkler system. When sprinkler systems are installed in factories and other buildings it is usual to surround the building with a buried high pressure water supply pipe from which lead pipes extend into the building to the sprinkler system. The water supply pipe is usually buried at a depth of five or six feet. In case it is subsequently desired to tap into the pipe for any reason as, for instance, to connect thereto additional lead-in pipes, it is necessary to provide an opening exposing a portion of the pipe and such opening heretofore has had to be relatively wide as, for example, about six feet wide to provide the requisite space for operating the usual pipe cutting devices, as, for example, the usual three wheel pipe cutter.

An object of the present invention is to provide a pipe cutting device which is especially adapted for cutting buried underground pipe and which is so constructed and can be so manipulated in operation that the opening exposing the pipe can be relatively narrow and still afford the requisite space for operating the device as, for instance, the opening need only be approximately one-half the width of the opening required in similar circumstances for the usual pipe cutting device.

Another object of the invention is to provide a pipe cutting device such as referred to in the last named object and which is of simply construction, can be readily applied to the pipe to be cut, is efficient in operation and can be manipulated by the operator in a minimum amount of free space.

A further object is to provide a pipe cutting device such as referred to in the preceding objects and which device is so constructed that the pipe cutting elements thereof are self feeding into the pipe during the rotation of the device on the pipe to be cut.

Further and additional objects and advantages residing in the invention and not hereinbefore expressly set forth will become apparent hereinafter during the detailed description of an embodiment of the invention which is to follow.

Referring to the accompanying drawing forming part of this specification and illustrating said embodiment of the invention—

Fig. 1 is an elevational view of a pipe cutting device embodying the invention with certain portions shown in section and with the device illustrated as mounted in pipe cutting position upon a pipe, the latter being shown in section.

Fig. 2 is a sectional view taken along line 2—2 of Fig. 1 looking in the direction of the arrows, and Fig. 3 is a fragmentary plan view of a portion of the device.

Referring to the drawing, a pipe to be cut and upon which the device embodying the invention is mounted is indicated at 10 and said pipe preferably is a cast iron pipe and it will be assumed that the pipe is buried underground but that the portion to be cut by the device has been exposed by digging the requisite opening for such purpose.

The pipe cutting device embodying the invention comprises a split ring or band 11 formed preferably of spring steel and which at its ends is provided with outstanding flanges 12 and 13 that have aligned openings therethrough. A clamping bolt 14 is mounted in the openings in the flanges 12 and 13 of the ring or band and the head 15 of said bolt 14 is shown as contacting the flange 12. The bolt 14 extends through and beyond the opening in the flange 13 and a suitable clamping nut 16 is screwed on the extended portion of the bolt, said nut being shown as in the form of a wing nut.

A plurality of circumferentially spaced integral spring feed fingers 17 divergently project from one circular edge of the ring or band 11 and each spring finger is separated from its adjacent fingers by narrow slots 18 extending longitudinally between the fingers from the outer free ends thereof to openings 19 located at the inner ends of the fingers, see Fig. 3. The size of the openings 19 is selected so as to provide the desired tension for the fingers as, for instance, the openings 19 can be made larger to lessen the tension of the fingers to that desired, or, conversely, they can be made smaller so the fingers will have greater tension.

The spring fingers 17 may be designated as feed fingers and each finger at its outer end is provided with an out-turned attaching flange 20 which extends in a plane that is transverse to the pipe on which the device is used or to the axis of the ring or band. A cutting element such as a hack saw blade 21, is detachably secured to each flange 20 by suitable means such as nuts and bolts indicated in the drawings, wherefore when hack saw blades 21 are attached to the flanges 20 of all of the fingers the saw-toothed ends of the blades will lie in a circle.

The hack saw blades are illustrated as provided on their opposite ends with the saw teeth and as being symmetrical, wherefore the blades can be reversed so that when the teeth on one end of the blades become dull through use the blades can be reversed and the teeth on the other end can be used.

The ring or band 11 on its outer circumference has rigidly secured to it by suitable means, such as by welding, tubular radially extending handles 22 which are illustrated as arranged in groups of three handles each, with the groups of handles circumferentially spaced around the ring or band 11 and with the handles of each group extending outwardly of the ring angularly with respect to each other. The handles 22 being tubular can have a turning bar or extension 23 inserted therein to provide the requisite leverage for turning the device if necessary and this feature will later be referred to in the explanation of the operation of the device.

The device also includes a split circular bushing 24 provided on one edge with an out-turned flange 25 and said bushing is positioned on the pipe within the ring or band 11 for a purpose later to be pointed out. The operation of the device heretofore described will now be set forth.

Let it be assumed that the cast iron pipe 10 is buried under ground. Also let it be assumed that an opening has been dug to expose the portion of the pipe that is to be cut by the device. This opening need only be of minimum width since it is not necessary to have an opening of extreme width in order to operate the pipe cutting device. In order to apply the device to the pipe the spring steel ring or band 11 is opened by removing the wing nut 16 and bolt 14 from the flanges 12 and 13, thus both ends of the ring or band can be spread apart and the ring or band passed around the pipe 10. The insert bushing 24 similarly can be positioned on the pipe and then passed between the ring or band 11 and the pipe until the flange 25 of the bushing contacts the edge of the ring or band that is opposite to the edge having the spring fingers 17. The bolt 14 is now passed through the openings in the flanges 12 and 13 and then the wing nut 16 is tightened to draw the ends of the ring toward each other and mount the ring and the bushing 24 loosely on the pipe. The tightening of the wing nut 16 should be only a thumb tightening operation. The insert bushing 24 is for the purpose of relieving the tension on the cutting teeth of the hack saw blades 21. After the device has been positioned properly on the pipe the bushing 24 may be removed from between the ring or band 11 and the pipe to provide additional tension on the cutting teeth of the hack saw blades if such additional tension is desired.

It will be understood that the circular series of teeth of the hack saw blades are now engaging the outer circumference of the pipe with a spring tension, due to the tension of the feed fingers 17. Consequently the operator can now grasp the handles 22 and rotate the device in the proper direction depending upon the kerf of the hack saw blades to cause the teeth of the blades to cut through the pipe. The blades will be fed radially inwardly through the material of the pipe as the rotation of the device continues due to the tension of the feed fingers 17. Consequently the rotation of the device by the operator effects severing of the pipe 10 in a minimum amount of time due to the action of the multiplicity of circularly arranged saws and to the feeding action effected by the spring feed fingers 17 on which the saw or blades are mounted.

In many instances the operator need only grasp the handles 22 in order to rotate the device in the cutting of a pipe since such handles will provide the requisite leverage for the operation. However, if additional leverage is needed, the operator can employ extension bars 23 which can be inserted into the tubular handles 22. Also if the device is mounted upon a pipe within a close or narrow opening the extension bars 23 can be inserted into the uppermost and substantially perpendicular handles 22 and operated from the exterior of the opening to turn the device and effect the cutting of the pipe.

As already stated, the blades 21 are symmetrically formed and if the teeth on one end thereof become dull the blades can be reversed. It will be noted that due to the great multiplicity of blades arranged in circular formation each blade is subjected to minimum strains or stresses, but even should one or a few of the blades become broken or badly damaged it is relatively easy to replace such blades with undamaged ones. After the pipe has been cut the device can be readily removed from the pipe by simply unloosening and removing the wing nut 16 and bolt 14 and spreading the band or ring 11 apart to slip it off of the pipe.

Although a preferred embodiment of the invention has been illustrated and described herein it will be understood that the invention is susceptible of various modifications and adaptations within the scope of the appended claims.

Having thus described my invention, I claim:

1. A pipe cutting device of the character described comprising a split ring or band adapted to be positioned on a pipe, means for drawing the ends of the ring or band toward each other, a series of circularly spaced spring feed fingers extending from an edge of said ring or band in a direction longitudinally of and divergently outwardly from the axis of said ring or band, a series of circularly spaced saw blades carried by the outer free ends of said fingers and located in a plane extending transversely to the axis of said ring or band and provided on their inner ends with cutting teeth, and handles carried by said ring or band for rotating the same relative to the pipe to which it is applied.

2. A pipe cutting device as defined in claim 1 and wherein said ring or band and said circular series of spaced spring feed fingers extending from an edge thereof constitute an integral structure.

3. A pipe cutting device as defined in claim 1 and wherein the outer free ends of said feed fingers have flanges extending outwardly in a plane transverse to the axis of the ring or band while said saw blades are secured to said flanges.

4. A pipe cutting device as defined in claim 1 and wherein the split ends of said ring or band are provided with outwardly extending flanges having aligned openings therein, while a bolt extends through said openings with its head engaging one of said flanges and mounts a nut engaging the other of said flanges whereby tightening of said nut on said bolt draws the ends of the ring or band toward each other.

5. A pipe cutting device as defined in claim 1 and wherein said ring or band adjacent the inner ends of said fingers and intermediate said fingers is provided with a series of circularly spaced openings the size of which affects the tension of said fingers.

6. A pipe cutting device as defined in claim 1 and including a split bushing adapted to be inserted within said ring or band to relieve the tension on the cutting teeth of the saw blades when the device is mounted on a pipe.

7. A pipe cutting device as defined in claim 1 and wherein said handles are circularly spaced around said band and extend outwardly from the outer circumference thereof and are tubular wherefore extension bars can be inserted in said handles to provide increased leverage for rotating the device relative to the pipe to which it is applied.

CHARLES MUCKENFUSS.

No references cited.